United States Patent

Matsumoto et al.

(10) Patent No.: US 8,853,595 B2
(45) Date of Patent: Oct. 7, 2014

(54) WELDING GUN

(75) Inventors: Koichi Matsumoto, Tochigi (JP); Hiroshi Miwa, Tochigi (JP)

(73) Assignee: Honda Motor Co., Ltd., Tokyo (JP)

(*) Notice: Subject to any disclaimer, the term of this patent is extended or adjusted under 35 U.S.C. 154(b) by 618 days.

(21) Appl. No.: 13/188,926

(22) Filed: Jul. 22, 2011

(65) Prior Publication Data
US 2012/0031887 A1    Feb. 9, 2012

(30) Foreign Application Priority Data
Aug. 4, 2010    (JP) ................. 2010-175099

(51) Int. Cl.
- B23K 9/10    (2006.01)
- B23K 9/00    (2006.01)
- B23K 11/31    (2006.01)

(52) U.S. Cl.
CPC .................. *B23K 11/314* (2013.01)
USPC .................. 219/137.31; 219/136

(58) Field of Classification Search
USPC ........ 219/136–137.31, 86.1–86.25, 86.33–90
See application file for complete search history.

(56) References Cited

U.S. PATENT DOCUMENTS

| | | | |
|---|---|---|---|
| 4,410,782 A | 10/1983 | Konno et al. | |
| 4,728,767 A * | 3/1988 | Hayashi | 219/89 |
| 6,723,944 B1 * | 4/2004 | Angel | 219/90 |
| 7,002,095 B2 | 2/2006 | Kato et al. | |

FOREIGN PATENT DOCUMENTS

| | | |
|---|---|---|
| EP | 1 407 850 A2 | 4/2004 |
| EP | 1 442 819 A2 | 8/2004 |
| EP | 2 072 172 A1 | 6/2009 |
| JP | 11-245051 A | 9/1999 |
| JP | 2005-021970 A | 1/2005 |
| WO | 2005/005089 A1 | 1/2005 |

OTHER PUBLICATIONS

"The Extended European Search Report" dated May 14, 2013; issued in corresponding application EP 11174854.7.
Notice of Reasons for Rejection issued to JP Application No. 2010-175099, mailed Dec. 3, 2013.

* cited by examiner

*Primary Examiner* — Sang Y Paik
(74) *Attorney, Agent, or Firm* — Carrier Blackman & Associates, P.C.; Joseph P. Carrier; Jeffrey T. Gedeon

(57) ABSTRACT

A welding gun is provided that can achieve both a size reduction and increase in pressure using a servo motor. The welding gun (1,2) includes an arm holder (30) having guide pins (31a, 31b and 32a, 32b) that are moveable along guide tracks (12a, 12b) formed in a gun bracket (10), and a mobile gun arm (40) is mounted to this arm holder. Roller followers (33a, 33b and 34a, 34b) engaging with the guide tracks around the guide pins are provided, and the mobile gun arm is made to open or close via the arm holder using a servo motor (72).

2 Claims, 6 Drawing Sheets

WELDING GUN

This application is based on and claims the benefit of priority from Japanese Patent Application No. 2010-175099, filed on 4 Aug. 2010, the content of which is incorporated herein by reference.

BACKGROUND OF THE INVENTION

1. Field of the Invention

The present invention relates to a welding gun. More specifically, the present invention relates to a welding gun (clamp welding gun) that welds in a state in which a work is sandwiched between a pair of electrode tips.

2. Related Art

Conventionally, among this type of welding gun, there has been a welding gun called an X gun. For example, an X gun 101 is of a structure in which two like structural members are joined at middle parts thereof, and are made to open and close like scissors around a fulcrum portion 100 joining the two structural members, as shown in FIG. 1. More specifically, a pair of electrode tips 121, 141 mounted to leading ends of a pair of gun arms 120, 140, respectively, that extend from the fulcrum portion 100 forward are made to open and close by a servo motor 172 provided more rearward than the fulcrum portion 100, whereby a force is applied to sandwich a work between the pair of electrode tips.

A conventional X gun is a so-called servo gun that uses a servo motor in the drive source thereof.

Furthermore, among welding guns (clamp welding guns), there has conventionally been a welding gun of guide track type. Welding guns of guide track type include a fixed gun arm that is fixed to a gun bracket, an arm holder having a guide pin that is moveable along a guide track formed in the gun bracket, a mobile gun arm that opposes the fixed gun arm, and a pressure cylinder (air cylinder) mounted to the gun bracket. Furthermore, the mobile gun arm is connected to the arm holder, and the mobile arm is made to open and close via the arm holder by the pressure cylinder (e.g., refer to Japanese Unexamined Patent Application, Publication No. H11-245051).

A conventional welding gun of guide track type is a so-called air gun, which uses an air cylinder in the drive source.

SUMMARY OF THE INVENTION

However, in the case of an X gun, the gun employs the principle of leverage. Therefore, an extremely large thrust force compared to the pressing force between the pair of electrode tips becomes necessary from the servo motor as the lengths of the gun arms become longer. In other words, the conversion efficiency of converting the thrust force to pressing force is low. As one example, a thrust force of around 1000 kgf may be required in a servo motor in order to produce a pressing force of 350 kgf.

Such a large thrust force cannot be produced if the servo motor is not large. Therefore, it has been difficult to achieve both a reduction in size and an increase in pressure, which are the most recent requirements for welding guns.

In contrast, in the case of a welding gun of guide track type, the pressing force required between the pair of electrode tips can be generated at a relatively low thrust force. In other words, the conversion efficiency of converting the thrust force to pressing force is high. As one example, a thrust force on the order of 600 kgf including the friction force may be sufficient to produce a pressing force of 500 kgf.

In a case of a so-called air gun using an air cylinder in the drive source, a relative reduction in size is possible, if the required thrust force is on this order.

In addition, simply from the viewpoint of the required thrust force, a relative reduction in size is possible also in the case of a so-called servo gun using a servo motor in the drive source.

However, there has been a problem that must be overcome in order to implement a servo (to change the drive source from an air cylinder to a servo motor) in a welding gun of guide track type.

Opening and closing of the mobile gun arm has been performed by guide pins of the arm holder moving along guide tracks of the gun bracket. There is naturally friction between the guide pins and the guide tracks, and while the guide pins are moving, it may become difficult to move from the friction due to the friction suddenly increasing, for example.

In the case of an air gun, even if movement becomes difficult due to friction, since high pressure can be applied by raising the air pressure, the guide pins can be set in motion by applying pressure until the frictional force is overcome.

On the other hand, in the case of a servo gun, if the friction suddenly increases, the motor controller will recognize it as a tracking error and the servo motor will stop.

Therefore, it has conventionally been difficult to implement a servo in a welding gun of guide track type.

The present invention has been made taking the aforementioned problems into account, and has an object of providing a welding gun that can both achieve a reduction in size and an increase in pressing force using a servo motor.

A welding gun according to the present invention includes: a gun bracket having a guide track formed therein; an arm holder having a guide pin that is installed to be movable along the guide track; and a mobile gun arm that is mounted to the arm holder, in which a roller follower engaging with the guide track is provided around the guide pin, and the mobile gun arm is made to open and close via the arm holder using a servo motor.

According to the present invention, the roller follower engaging with the guide track is provided around the guide pin.

The contact between the guide pin and the guide track is thereby made to be rolling contact, and thus the frictional resistance while the guide pin is moving along track in continuous contact therewith can be reduced. Therefore, in the welding gun of guide track type for which the conversion efficiency for converting thrust force to a pressing force is high compared to a welding gun of X-gun type, a conventional air gun can be easily converted to be made to implement a servo.

In this case, it is preferable to further include a cover member that is disposed between the arm holder and the gun bracket, moves integrally with the guide pin, and has a size adequate to cover the guide track irrespective of a position of the guide pin.

According to the present invention, a cover member is provided that moves integrally with the guide pin, and has a size adequate to cover the guide track irrespective of a position of the guide pin.

Sputter generated from welding can thereby be prevented from penetrating into the guide track.

Since the cover member prevents grease inside the guide track from leaking to outside thereof, it allows the sliding resistance between the roller follower and the guide track to be reduced over a long time period.

In this case, it is preferable to further include a cover member that has a size adequate to cover the guide track and has an opening corresponding to a movement path of the guide pin, which is a smaller diameter than the roller follower, is provided to be fixed to the gun bracket on an arm holder side thereof.

According to the present invention, a cover member formed in a size adequate to cover the guide track and having an opening corresponding to a movement path of the guide pin, which is a smaller diameter than the roller follower, is provided to be fixed to the gun bracket.

Since the cover members are not mobile, the welding gun can be configured to be compact.

Since only the movement path of the guide pin is open, sputter generated by welding can be prevented as much as possible from penetrating inside of the guide track.

The rolling track of the roller follower in the guide track is covered by the cover member. As a result, grease inside the guide track is prevented from leaking to outside thereof, which allows for the sliding resistance between the roller follower and the guide track to be reduced over a long time period.

According to the present invention, a roller follower engaging with the guide track is provided around the guide pin. The contact between the guide pin and the guide track is thereby made to be rolling contact, and thus the frictional resistance while the guide pin is moving along track in continuous contact therewith can be reduced. Therefore, in the welding gun of guide track type for which the conversion efficiency for converting thrust force to a pressing force is high compared to a welding gun of X-gun type, a conventional air gun can be easily converted to be made to implement a servo.

DETAILED DESCRIPTION OF THE INVENTION

Figure 1:
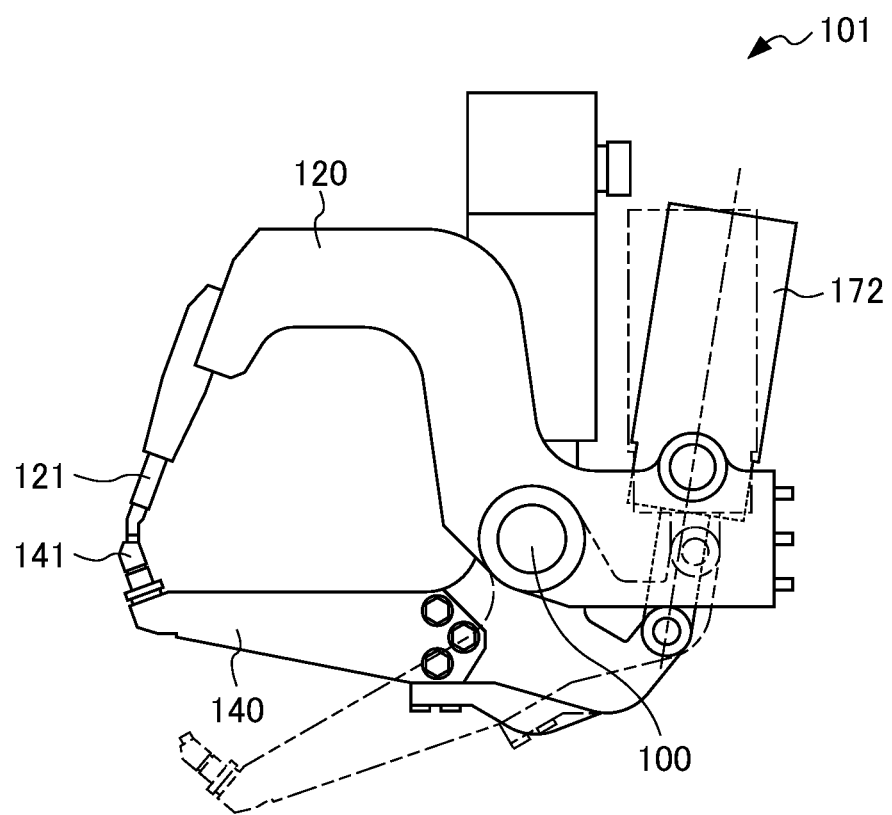
FIG. 1 is a side view showing a conventional welding gun of X-gun type.

Embodiments of the present invention will be explained hereinafter while referring to the drawings.

Figure 2:
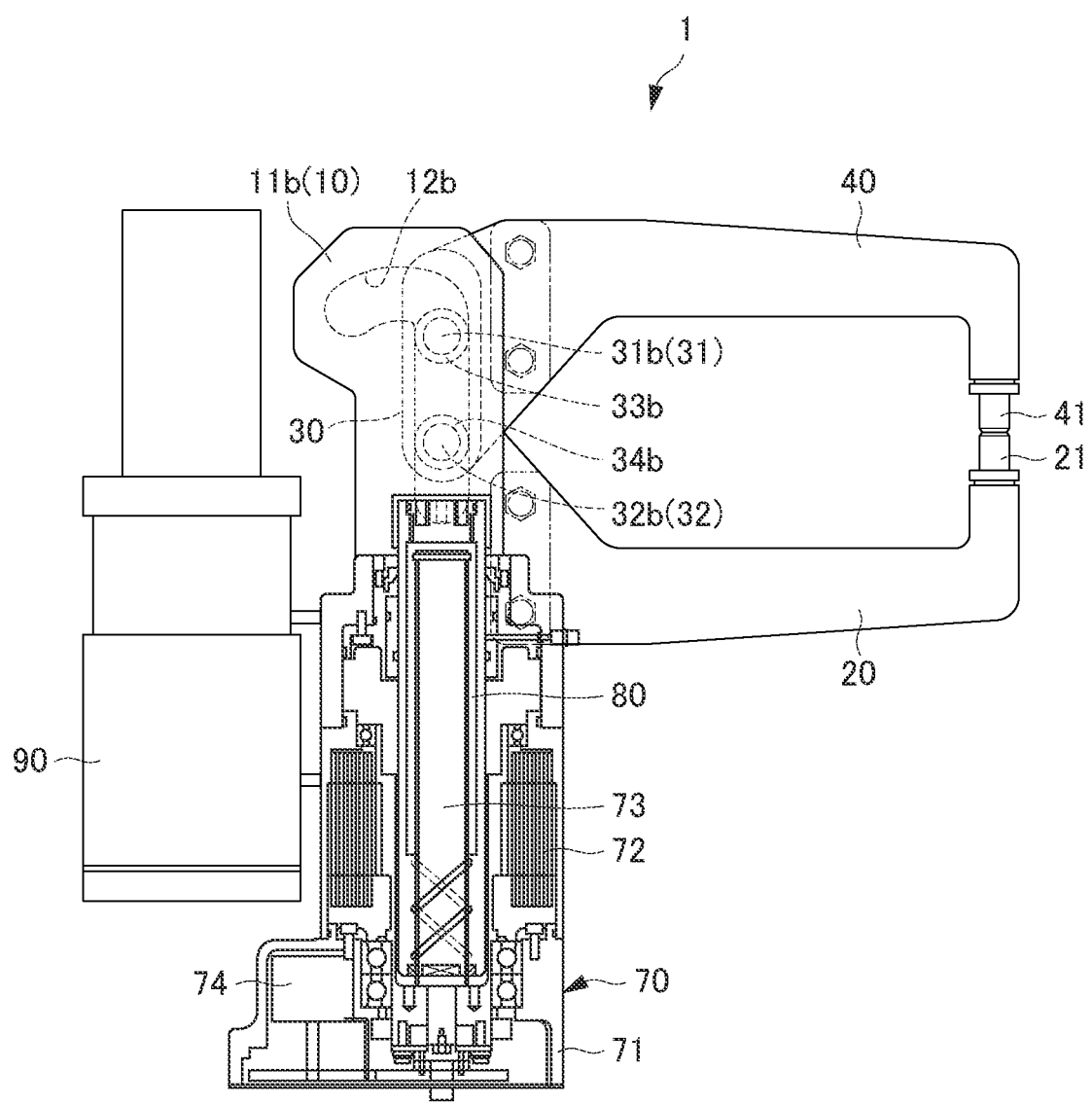
FIG. 2 is a side view showing a welding gun according to a first embodiment of the present invention.
Figure 3A:
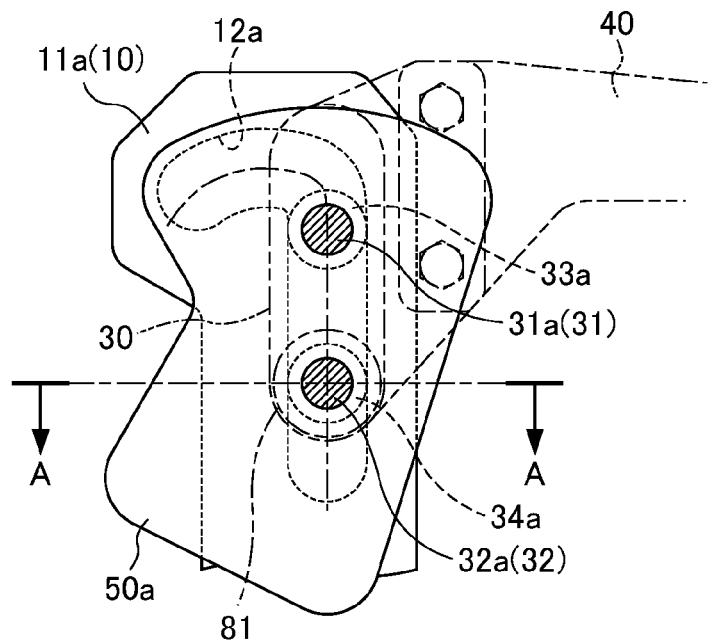
FIGS. 3A and 3B provide enlarged side views of a relevant section of the welding gun shown in FIG. 2.
Figure 3B:
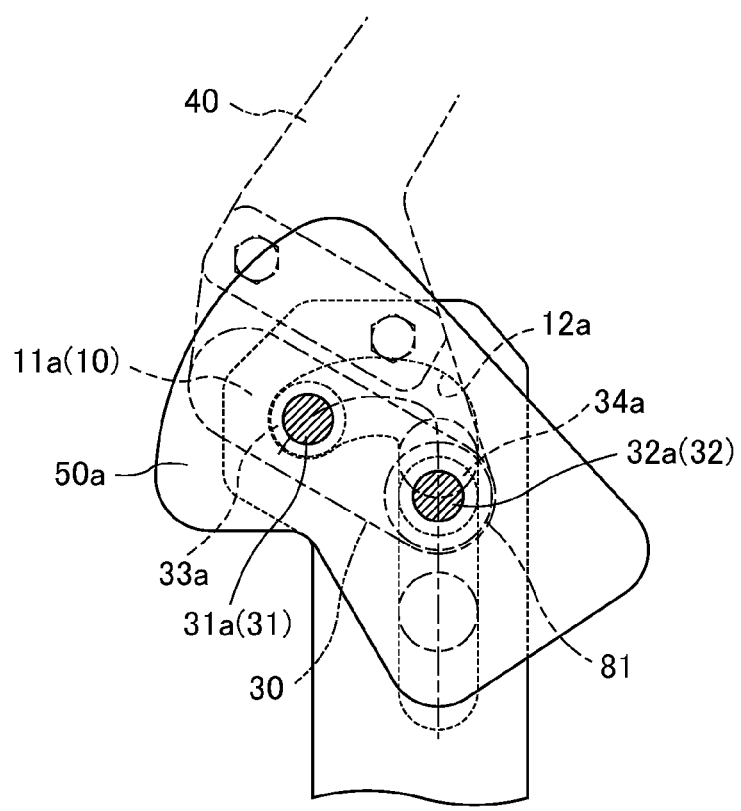
Figure 4:
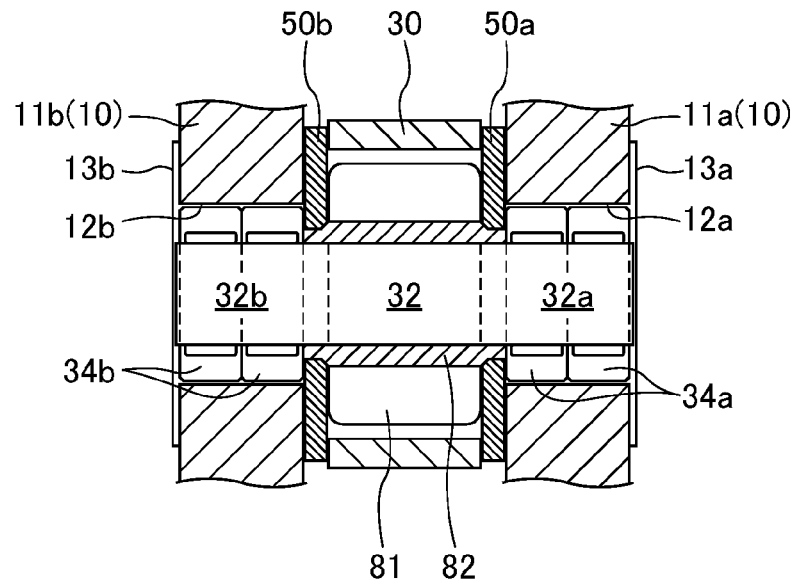
FIG. 4 is a cross-sectional plan view taken along the line A-A in FIG. 3A.

FIG. 2 is a side view showing a welding gun 1 according to a first embodiment of the present invention. FIGS. 3A and 3B are enlarged side views of a relevant section thereof. FIG. 4 is a cross-sectional plan view thereof.

This welding gun 1 is a welding gun of guide track type, and further, is a so-called servo-gun using a servo motor in a drive source thereof.

The welding gun 1 includes a gun bracket 10, a fixed gun arm 20, an arm holder 30, a mobile gun arm 40, cover members 50a, 50b, a motor drive unit 70, and a transformer 90.

The gun bracket 10 includes a pair of left and right side plates 11a, 11b separated by a predetermined interval as shown in FIG. 4. The lower ends of both side plates 11a, 11b are integrally fixed.

Guide tracks 12a, 12b of reverse J shape extending vertically and having an upper end curved back (left in FIG. 3) are respectively formed in the side plates 11a, 11b of the guide bracket 10 to oppose each other, as shown in FIG. 3.

A based end of the fixed gun arm 20 is fixed to a lower part of the gun bracket 10, and the fixed gun arm 20 extends from the gun bracket 10 forwards (right in FIG. 2). An electrode tip 21 is installed to a leading end of the fixed gun arm 20 to face upwards.

The arm holder 30 is disposed between the side plates 11a, 11b of the gun bracket 10. A top and a bottom two through pins 31, 32, each extending substantially horizontally, are installed in the arm holder 30.

Projecting portions of the through pin 31 on the upper side projecting from both left and right side faces of the arm holder 30 in both left and right directions configure left and right guide pins 31a, 31b on the upper side, respectively.

Projecting portions of the through pin 32 on the lower side projecting from both left and right side faces of the arm holder 30 in both left and right directions configure left and right guide pins 32a, 32b on the lower side, respectively.

Roller followers 33a, 33b engaging with the guide tracks 12a, 12b are installed around the guide pins 31a, 31b.

The roller followers 34a, 34b engaging with the guide tracks 12a, 12b are installed around the guide pins 32a, 32b, respectively.

As a result, the arm holder 30 moves along the guide tracks 12a, 12b by the roller followers 33a, 33b and 34a, 34b of the top and bottom guide pins 31a, 31b and 32a, 32b moving along the guide tracks 12a, 12b, respectively.

A base end of the mobile gun arm 40 is fixed to the arm holder 30, and the mobile gun arm 40 extends from the arm holder 30 forward (right in FIG. 2). The electrode tip 41 is installed to the leading end of the mobile gun arm 40 to face downwards.

The mobile gun arm 40 moves along the guide tracks 12a, 12b accompanying the arm holder 30 moving along the guide tracks 12a, 12b.

The cover members 50a, 50b are provided between the arm holder 30 and the side plates 11a, 11b of the gun bracket 10, i.e. on the interior of the side plates 11a, 11b.

The cover members 50a, 50b move integrally with the top and bottom guide pins 31a, 31b and 32a, 32b, and have adequate size to cover the guide tracks 12a, 12b, irrespective of the positions of the top and bottom guide pins 31a, 31b and 32a, 32b.

Specifically, when the arm holder 30 is at a bottom position (closed position of the mobile gun arm 40 at which the electrode tip 41 of the mobile gun arm 40 abuts the electrode tip 21 of the fixed gun arm 20), as shown in FIG. 3A, the cover members 50a, 50b cover the guide tracks 12a, 12b.

When the arm holder 30 is at a top position (opened position of the mobile gun arm 40), as shown in FIG. 3B, the cover members 50a, 50b cover the guide tracks 12a, 12b.

Even if the mobile gun arm 40 is at any position between the closed position and the opened position, the cover members 50a, 50b will cover the guide tracks 12a, 12b.

Plate members (iron plate) 13a, 13b for covering the guide tracks 12a, 12b are installed to the exterior of the side plates 11a, 11b, respectively.

The motor drive unit 70 includes a unit housing 71, a servo motor 72, a feed-screw mechanism 73, an encoder 74, and a push rod 80.

The unit housing 71 houses the servo motor 72, the feed-screw mechanism 73, the encoder 74 and the push rod 80. The unit housing 71 is integrally fixed to lower ends of both side plates 11a, 11b of the gun bracket 10.

The servo motor 72 and the push rod 80 are connected so that rotational motion of the servo motor 72 is converted to advancing/retracting motion (vertical motion) of the push rod 80 in an axial direction thereof via the feed-screw mechanism 73, which is configured by a ball screw and a nut.

A knuckle 81 of the push rod 80 at a leading end thereof is installed to the lower side through pin 32 of the arm holder 30 through a metal bushing 82.

The encoder 74 detects the rotation angle of the servo motor 72 in order to accurately determine the timing at which to flow current between both electrode tips 41, 21 when the electrode tip 41 of the mobile gun arm 40 moves to a certain position relative to the electrode tip 21 of the fixed gun arm 20, and in order to control the movement of the mobile gun arm 40.

The transformer 90 is mounted to the exterior of the motor drive unit 70. The transformer 90 flows welding current between the electrode tips 41, 21 when a work (metal plate material) is sandwiched by the electrode tip 41 of the mobile gun arm 40 and the electrode tip 21 of the fixed gun arm 20.

In the welding gun 1 configured in the above way, the push rod 80 moves up or down when the servo motor 72 is made to drive, and the arm holder 30 moves up or down via the through pin 32 to which the knuckle 81 of the push rod 80 is installed, whereby the mobile gun arm 40 opens or closes.

When the mobile gun arm 40 is closed, a work (metal plate material) is sandwiched between the electrode tip 41 of the mobile gun arm 40 and the electrode tip 21 of the fixed fun arm 20, and then spot welding is performed.

There are the following effects according to the first embodiment.

(1) The roller followers 33a, 33b and 34a, 34b engaging with the guide tracks 12a, 12b are installed around the guide pins 31a, 31b and 32a, 32b, respectively.

Contact between the guide pins 31a, 31b and 32a, 32b and the guide tracks 12a, 12b is thereby made to be rolling contact, and thus the frictional resistance while the guide pins 31a, 31b and 32a, 32b move along tracks 12a, 12b in continuous contact therewith can be reduced. Therefore, in the welding gun 1 of guide track type for which the conversion efficiency of converting a thrust force to a pressing force is high compared to a welding gun of X-gun type, a conventional air gun can be easily made to implement a servo.

(2) Variation in the pressing force can be suppressed by the roller followers 33a, 33b and 34a, 34b engaging with the guide tracks 12a, 12b being provided around the guide pins 31a, 31b and 32a, 32b.

(3) The cover members 50a, 50b are provided between the arm holder 30 and the side plates 11a, 11b of the gun bracket 10. The cover members 50a, 50b move integrally with the guide pins 31a, 31b and 32a, 32b, and have adequate size to cover the guide tracks 12a, 12b, irrespective of the positions of the guide pins.

Sputter generated from welding can thereby be prevented from penetrating into the guide tracks 12a, 12b.

(4) Since the cover members 50a, 50b prevent grease inside the guide tracks 12a, 12b from leaking to outside thereof, they allow the sliding resistance between the roller followers 33a, 33b and 34a, 34b and the guide tracks 12a, 12b to be reduced over a long time period.

Figure 5:
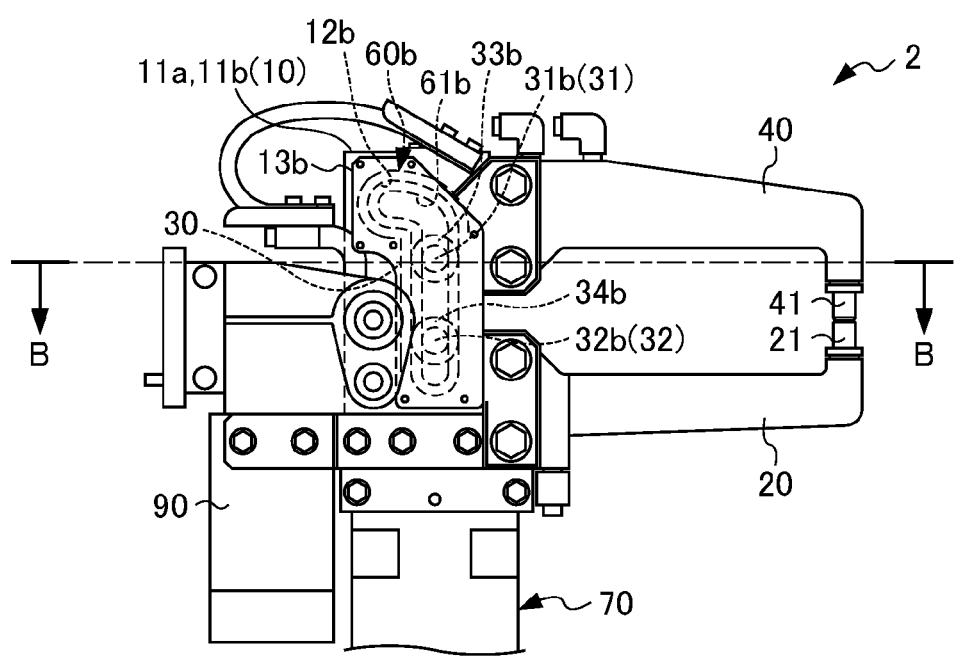
FIG. 5 is a side view showing a welding gun according to a second embodiment of the present invention.
Figure 6:
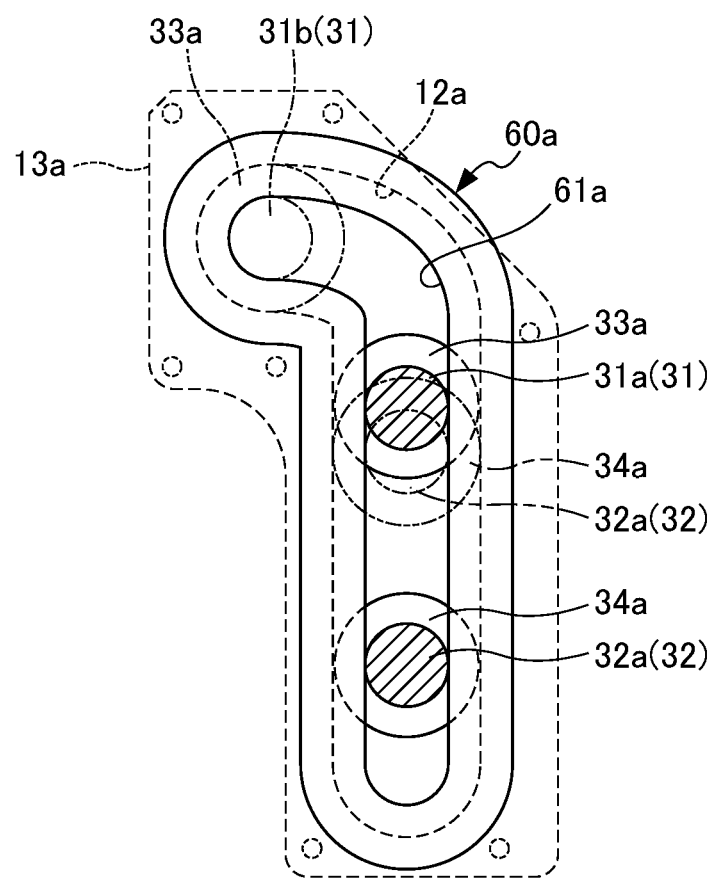
FIG. 6 is an enlarged side view of a relevant section of the welding gun shown in FIG. 5.
Figure 7:
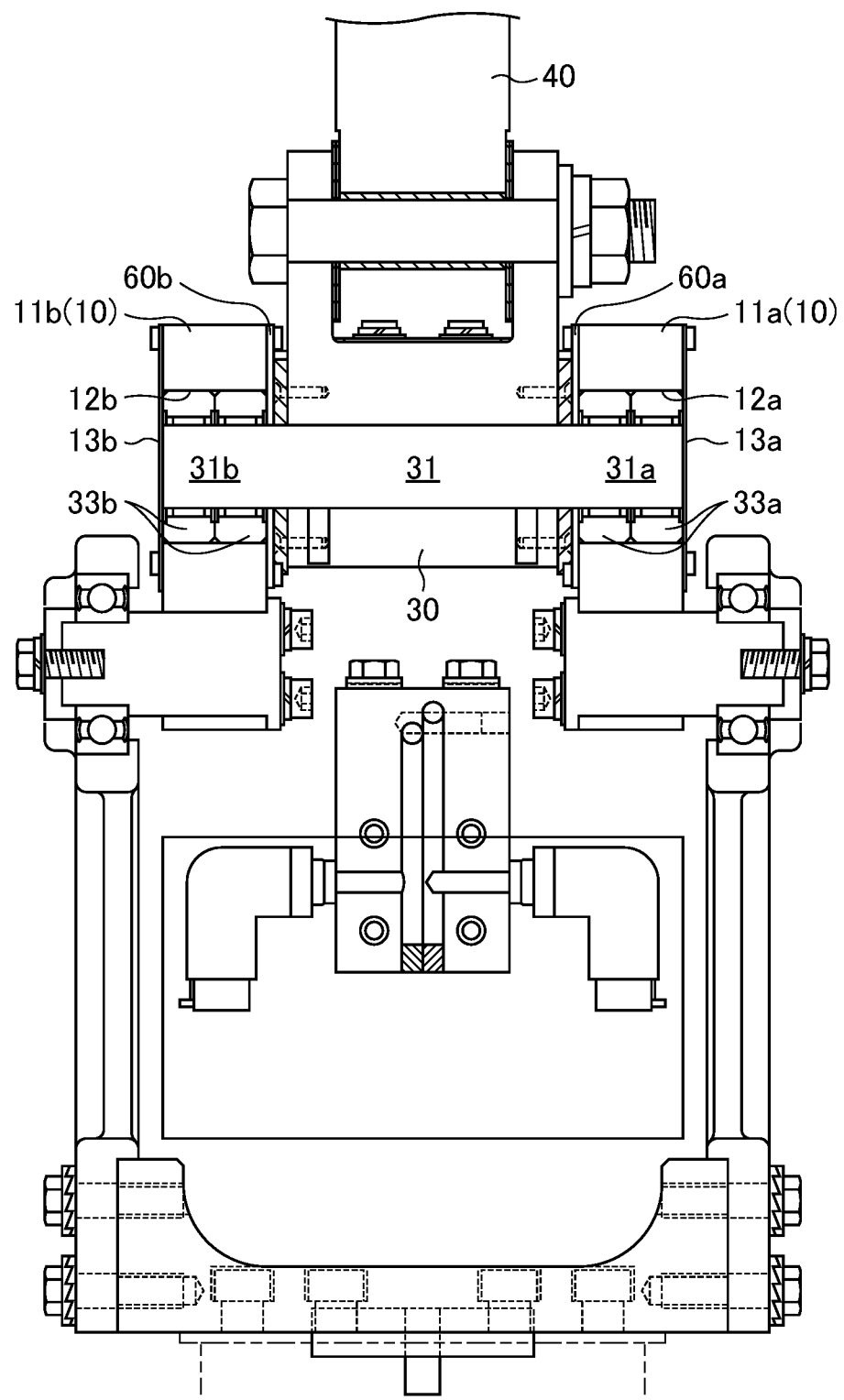
FIG. 7 is a cross-sectional plan view taken along the line B-B in FIG. 5.

FIG. 5 is a side view showing a welding gun 2 according to a second embodiment of the present invention. FIG. 6 is an enlarged side view of a relevant section thereof. FIG. 7 is a cross-sectional plan view thereof.

This welding gun 2 is also a welding gun of guide track type, and further is a so-called servo-gun using a servo motor in a drive source thereof.

The welding gun 2 includes a gun bracket 10, a fixed gun arm 20, an arm holder 30, a mobile gun arm 40, cover members 60a, 60b, a motor drive unit 70, and a transformer 90.

The gun bracket 10, the fixed gun arm 20, the arm holder 30, the mobile gun arm 40, the motor drive unit 70 and the transformer 90 are substantially the same as in the welding gun 1 according to the first embodiment. Therefore, reference symbols that are the same as the reference symbols used for the welding gun 1 are assigned and illustrated for similar components, and detailed explanations thereof will be omitted.

The cover members 60a, 60b are provided to be fixed to the arm holder 30 sides of the side plates 11a, 11b of the gun bracket 10.

The gun covers 60a, 60b are formed with an adequate size to cover the guide tracks 12a, 12b, respectively. Furthermore, the cover members 60a, 60b respectively have openings 61a, 61b corresponding to the movement paths of the guide pins 31a, 31b and 32a, 32b, which are of a smaller diameter than the roller followers 33a, 33b and 34a, 34b.

In other words, as shown by the solid lines in FIG. 6, when the guide pins 31a, 31b and 32a, 32b are at bottom positions (closed position of the mobile fun arm 40 at which the electrode tip 41 of the mobile gun arm 40 abuts the electrode tip 21 of the fixed gun arm 20 (refer to FIG. 5)), the guide pins 31a, 31b and 32a, 32b are positioned inside of the openings 61a, 61b of the cover members 60a, 60b, and the roller followers 33a, 33b and 34, 34b are concealed in the cover members 60a, 60b.

As shown by the dashed-two dotted lines in FIG. 6, when the guide pins 31a, 31b and 32a, 32b are at the top positions (opened position of the mobile gun arm 40 (not illustrated)), the guide pins 31a, 31b and 32a, 32b are positioned inside of the openings 61a, 61b of the cover members 60a, 60b, and the roller followers 33a, 33b and 34a, 34b are concealed in the cover members 60a, 60b.

Even if the mobile gun arm 40 is at any position between the closed position and the opened position, the guide pins 31a, 31b and 32a, 32b are positioned inside of the openings 61a, 61b of the cover members 60a, 60b, and the roller followers 33a, 33b and 34a, 34b will be concealed in the cover members 60a, 60b.

In the welding gun 1 configured in the above way, the push rod (not illustrated) moves up or down when the servo motor (not illustrated) is made to drive, and the arm holder 30 moves up or down via the through pin 32 to which the knuckle (not illustrated) of the push rod is installed, whereby the mobile gun arm 40 opens or closes.

When the mobile gun arm 40 is closed, a work (metal plate material) is sandwiched between the electrode tip 41 of the mobile gun arm 40 and the electrode tip 21 of the fixed fun arm 20, and then spot welding is performed.

In addition to the above-mentioned effects (1) to (4), there are the following effects according to the second embodiment.

(5) The cover members 60a, 60b are provided to be fixed to an arm holder 30 side of the side plates 11a, 11b of the gun bracket 10, respectively. The cover members 60a, 60b are formed to be an adequate size to cover the guide tracks 12a, 12b, and have openings 61a, 61b corresponding to the movement paths of the guide pins 31a, 31b and 32a, 32b, which are smaller diameter than the roller followers 33a, 33b and 34a, 34b, respectively.

Since the cover members 60a, 60b are not mobile, the welding gun 2 can be configured to be compact.

(6) Since only the movement paths of the guide pins 31a, 31b and 32a, 32b are open, sputter generated by welding can be prevented as much as possible from penetrating inside of the guide tracks 12a, 12b.

(7) The rolling tracks of the roller followers 33a, 33b and 34a, 34b in the guide tracks 12a, 12b are covered by the cover members 60a, 60b, respectively.

Grease inside the guide tracks 12a, 12b is thereby prevented from leaking to outside thereof, which allows for the sliding resistance between the roller followers 33a, 33b and 34a, 34b and the guide tracks 12a, 12b to be reduced over a long time period.

What is claimed is:

1. A welding gun comprising:
    a gun bracket having a guide track formed therein;
    an arm holder having a guide pin that is installed to be movable along the guide track;
    a mobile gun arm that is mounted to the arm holder; and
    a cover member that is disposed between the arm holder and the gun bracket, moves integrally with the guide pin, and has a size adequate to cover the guide track irrespective of a position of the guide pin,
    wherein a roller follower engaging with the guide track is provided around the guide pin, and
    wherein the mobile gun arm is made to open and close via the arm holder using a servo motor.

2. A welding gun comprising:
    a gun bracket having a guide track formed therein;
    an arm holder having a guide pin that is installed to be movable along the guide track;
    a mobile gun arm that is mounted to the arm holder; and
    a cover member that has a size adequate to cover the guide track and has an opening corresponding to a movement path of the guide pin, which is a smaller diameter than a roller follower, is provided to be fixed to the gun bracket on an arm holder side thereof,
    wherein a roller follower engaging with the guide track is provided around the guide pin, and
    wherein the mobile gun arm is made to open and close via the arm holder using a servo motor.

* * * * *